(12) United States Patent  
Hars

(10) Patent No.: US 7,315,874 B2
(45) Date of Patent: Jan. 1, 2008

(54) ELECTRONIC CIRCUIT FOR RANDOM NUMBER GENERATION

(75) Inventor: Laszlo Hars, Cranberry Township, PA (US)

(73) Assignee: NXP B.V., Eindhoven (NL)

( * ) Notice: Subject to any disclaimer, the term of this patent is extended or adjusted under 35 U.S.C. 154(b) by 764 days.

(21) Appl. No.: 10/801,725

(22) Filed: Mar. 15, 2004

(65) Prior Publication Data

US 2005/0004960 A1    Jan. 6, 2005

Related U.S. Application Data

(60) Provisional application No. 60/454,814, filed on Mar. 14, 2003.

(51) Int. Cl.
*G06F 7/58* (2006.01)

(52) U.S. Cl. ..................... 708/251

(58) Field of Classification Search ............ 708/251
See application file for complete search history.

(56) References Cited

U.S. PATENT DOCUMENTS

| | | | |
|---|---|---|---|
| 4,769,777 A * | 9/1988 | Bittle et al. | 708/251 |
| 6,522,210 B1 * | 2/2003 | Dvorak et al. | 331/78 |
| 6,807,553 B2 * | 10/2004 | Oerlemans | 708/252 |
| 7,188,131 B2 * | 3/2007 | Bardouillet | 708/251 |

* cited by examiner

*Primary Examiner*—D. H. Malzahn

(57) ABSTRACT

A random number generator includes a flip-flop, and a pair of independent free-running oscillators having a respective set of 4 switches controlled with a non-inverted and inverted output of the flip-flop. An output from each of the oscillators is fed back to their respective input via a delay device. The pair of oscillators each has a feedback loop switch, and a pair of cross gate switches, each of which respectively connects an input signal of one oscillator to an output of another oscillator of the pair of oscillators. When the feedback loop switches are open and the cross gate switches are closed, the pair of oscillators forming a flip-flop with positive feedback resolves to a logic state that in a metastable way, producing an unpredictable (random) logic signal.

30 Claims, 3 Drawing Sheets

ELECTRONIC CIRCUIT FOR RANDOM NUMBER GENERATION

This application claims priority to Ser. No. 60/454,814 filed Mar. 14, 2003.

FIELD OF THE INVENTION

The invention relates to the phenomenon of metastability and the effect of metastability on semiconductors. More particularly, the present invention relates to an increase in the randomness of a random number generator, and its ability to withstand environmental changes better than known in the prior art.

BACKGROUND ART

Latches and flip-flops are widely used in all types of electronic devices for counting, sampling, and storage of data. There are a number of different types of flip-flops named after their primary function, such as D-type flip-flops (data), J-K flip flops (J and K inputs), and R-S flip-flops (having R and S latches, standing for "reset: and "set". D flip-flops are a clocked flip-flop having a one clock pulse delay for its output.

However, the operating conditions of the flip-flops can be violated because hold times and setup times are not always consistent with the specifications (such as provided in the data sheets) of the flip flops used. The violation of the operating conditions of the flip-flops can cause them to go into an unstable (metastable) state that can affect the entire operation of the linked systems. Metastability can occur when both inputs to a latch are set at a logic high (11) and are subsequently set at a logic low (00).

Metastability can cause the latch outputs to oscillate unpredictably in a statistically known manner. Such metastable values are then detected by other circuitry as different logic states. It has been realized by both the present inventor and others in the art that the unpredictability of the oscillations could be useful as a random number generator for a multitude of practical uses.

Current designs of physical (true) random number generators based on flip-flop metastability used fixed delay values between their inputs to violate setup and hold timings, in order to provoke metastability. Eventually, the metastable state resolves to some logic level, which is effectively random, depending on the internal noise of the flip-flops. However, the fixed delay values used by the prior art can cause the random number generator to be susceptible to environmental changes. In addition, fixed delay values at large manufacturing variations can make the circuit not work at all or not work at optimal speed.

SUMMARY OF THE INVENTION

The present invention provides a physical random number generator using only standard digital components. The circuit stops and starts two free running oscillators. The instantaneous voltage of the oscillators at the time of stop do not usually reach true logic levels (i.e. cannot be discerned as a 0 or 1). These voltage levels are applied to the inputs of a bi-stable digital device (latch, flip-flop) provoking metastability. The metastable state eventually resolves in settling to a final standard logic state. The logic value to which the circuit settles depends on the instantaneous voltage (affected by the phase drifts) of the two free running oscillators and the resolution of the metastable states. Thus, the final value of the random number generator circuit of the instant invention is more random than previous prior art circuits, as well as being more tolerant to environmental changes than such prior art circuitry.

DETAILED EMBODIMENTS

Figure 1A:
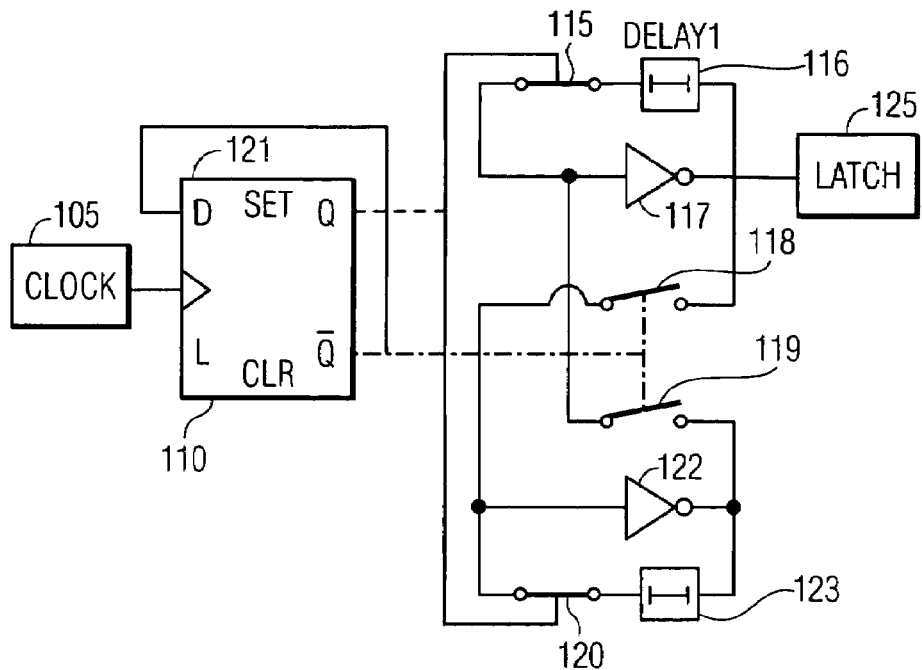
FIG. 1A illustrates one arrangement of a random number generator according to the present invention. As the switches are shown the inverters are not connected to each other, oscillator feedback loops are closed so the inverters form two independent free running oscillators.
Figure 1B:
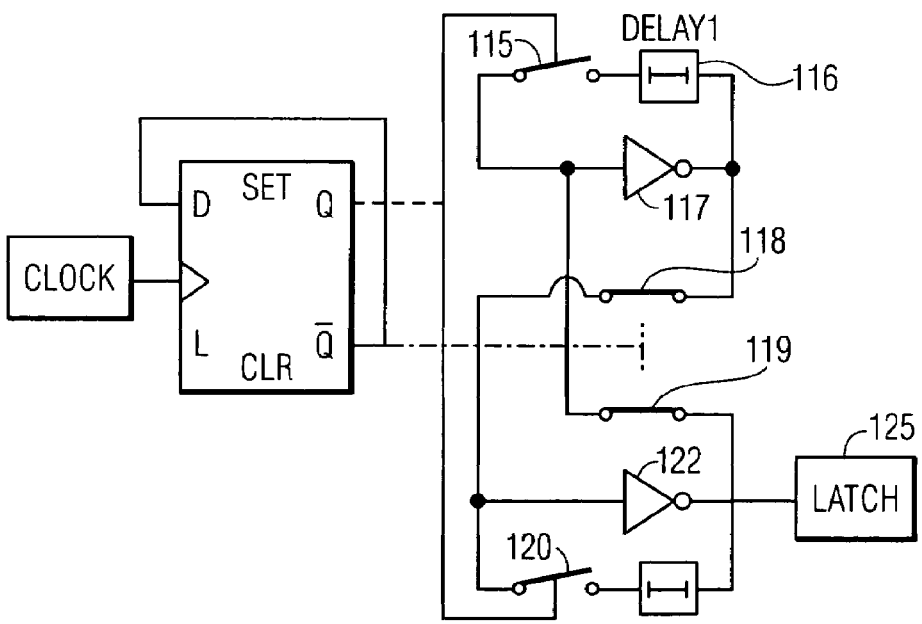
FIG. 1B illustrates the random number generator shown in FIG. 1A having the oscillator feedback loops opened and the inverters cross-connected. As the switches are shown the cross-connected inverters form a latch.

FIGS. 1A and 1B illustrate one arrangement of a random number generator according to the instant invention. It is understood by persons of ordinary skill in the art that the type of gates shown was selected for explanatory purposes, and there can be different arrangements of different type of gates (NAND, NOR, XOR, etc.) in terms of size, function and connectivity that fall within the spirit of the invention and the scope of the appended claims.

With regard to FIG. 1A, a clock 105 provides an input to D flip-flop 110. The Q (non-inverted) output of the D flip-flop is connected to switches 115, 120, and the inverted Q output is fed back to the D input so that the flip-flop provides a square wave output on both the normal and inverted D and D bar. The switches 115,120 can be referred to as oscillator. feedback switches. If the two switches 115,120 are closed and the switches 118, 119 are open as shown in the diagram above, the two inverters 117,122 form two independent free running (ring) oscillators. A latching device 125 connected to at least one of the oscillator outputs will permit a reading of a random generated bit when the cross gate switches 118,119 are reopened.

The delay elements 116, 123 can be implemented, for example, as a series of buffer gates or an even number of inverters (0, 2, 4 . . . ). The corresponding delay values should be sufficiently different (e.g. 5 and 7 buffers) such that in case of a strong external signal there is little chance that both oscillators would synchronize to it. The delay devices can be different lengths of wires.

As shown in FIG. 1B, the inverters 117, 122 of the random number generator form a latch by having their gates cross-connected via the closing of switches 118, 119 (and opening the switches 115, 120). Due to positive feedback, the cross connected gates eventually latch up, resolving to a logic state. In order to read a random-generated bit, the output of one of the inverters can be latched at the time of opening the switches 119,118 to latch mechanism 125.

As shown in FIG. 1B, the random number generator shown of in FIG. 1A has the oscillator feedback loops opened (by the opening of switches 115, 120) and the inverters cross-connected by the closing of switches 118, 119. By opening the feedback loops, the free running oscillators are stopped. The relative and absolute values of the instantaneous output voltages and the internal noise determine the logic state to which the newly formed latch circuit will settle in. Thus, the two free-running oscillators are effectively sampled at the pace of an independent clock 115 and occasional metastable states of the sampling latch resolve to a random final logic state. The pair of oscillators (inverters) forms a bi-stable device with positive feedback resolving to a logic state by opening the feedback loop switches and closing the cross gate switches.

Metastability can come in the following ways:

1. When the oscillators are switched on there is a delay from the switching on to their starting. This delay (or hesitation) causes the voltage to go up or down for a short period of time, thereby creating an uncertain starting point. It should be noted that in a best mode the loop gain must be small; otherwise the oscillators may start immediately without the delay (a.k.a. hesitation).

2. When the oscillators are stopped, the gates become cross-connected. At this point one or both output voltages could be between logic levels. The flip-flop, which is formed by the two inverters, has to settle to a logic state. However, the settling to a logic state occurs in a metastable way, the oscillation does not stop immediately, with the period becoming gradually longer and longer until the voltages resolve to their final value.

It should be noted that the instant invention uses CMOS logic gates not in digital but in analog mode. In addition, it should be understood that there are various modifications that may be made by a person of ordinary skill in the art that do not depart from the spirit of the invention and the scope of the appended claims. For example, the last delay gate could be of a tri-state type, when switching the loop requires activating/deactivating the high impedance output. The number of inverters can be different, as could the number or type of switches used.

Figure 2A:
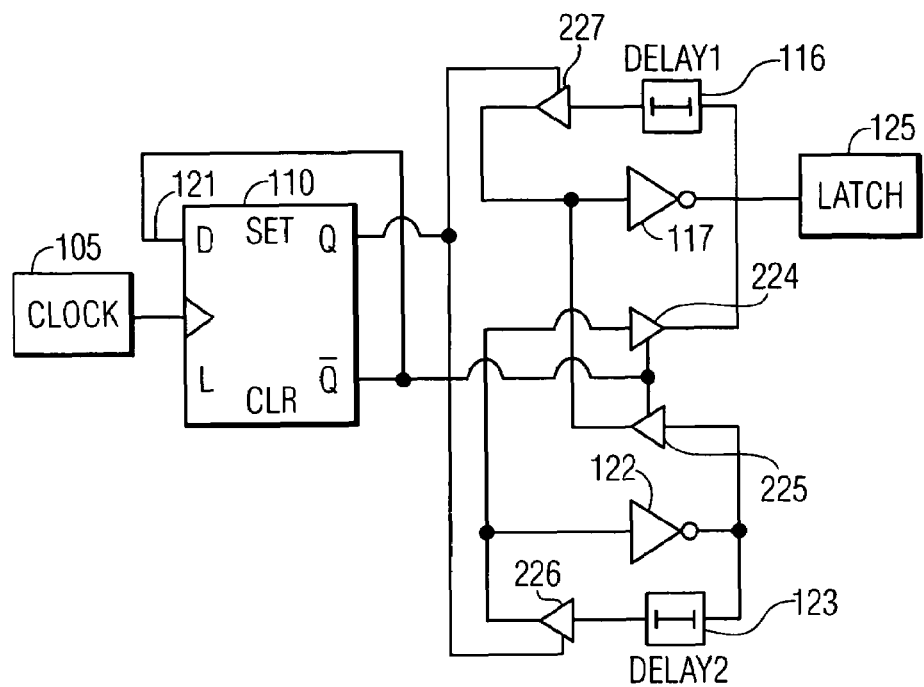
FIGS. 2A-2C illustrate some of the many variations of the present invention.
Figure 2B:
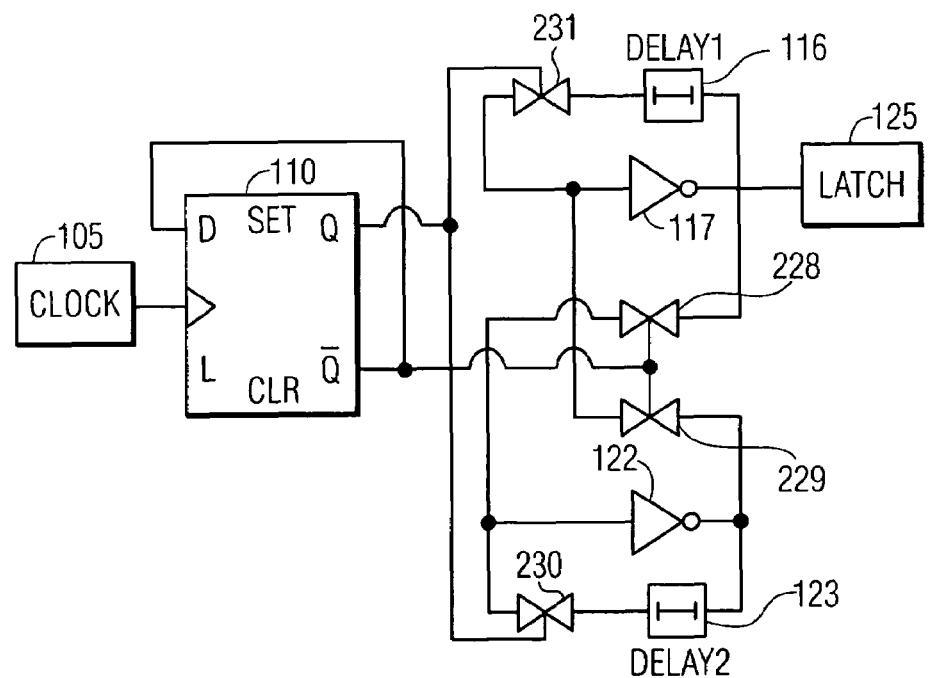
Figure 2C:
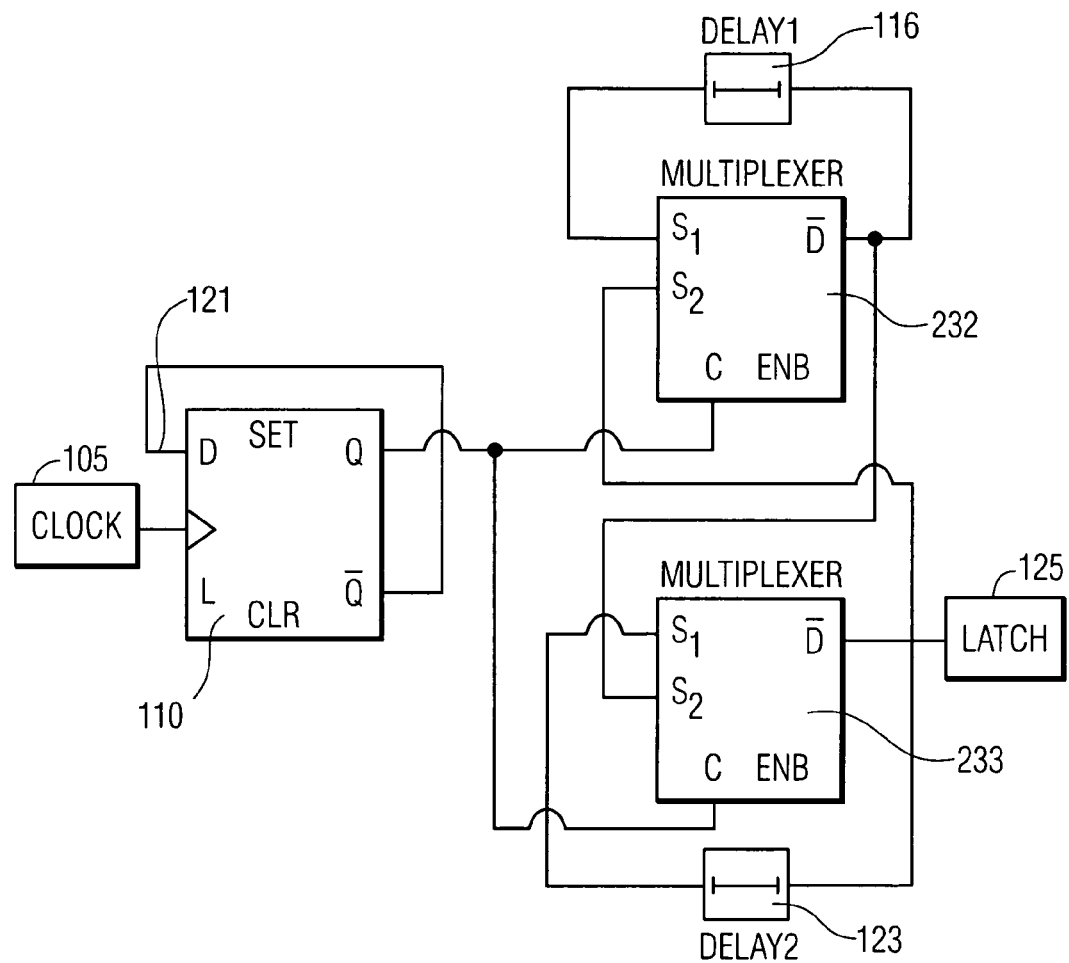

FIGS. 2A-2C illustrate some variations of how the instant invention can be practiced. For example, with regard to FIG. 2A, the last delay gate could be of a tri-state type, and switching the loop requires activating the high impedance output.

With regard to FIG. 2B, a straightforward implementation uses transition gates 228-231, which are essentially analog switches. Although it is true that most standard CMOS logic component libraries no longer include the transition gates, this configuration is still possible for those that do include such gates.

FIG. 2C illustrates one of the easiest ways to implement the randomness source through the use of two inverting multiplexers 232,233. When their $S_1$ inputs are activated, they both form ring oscillators. When their $S_2$ inputs get activated, two cross connected inverters result, forming a latch. A latch mechanism 125 is connected to one of the outputs of the multiplexers.

It will be appreciated by an artisan that the claimed invention has significant breadth and should not be limited to the aspects shown and described. For example, the pair of oscillators with at least one delay device may constitute a simple version of the invention.

Also, it is to be understood by persons of ordinary skill in the art that a "delay device" may comprise a length of wire, with different delays afforded different lengths of wire.

While the use of switches for cross gate and feedback loops is preferred, they are not required and could also vary in number other than four. While it is preferable that the switches be controlled by a flip-flop, such a device is not a requirement to practice the claimed invention. In addition, the type of flip-flop, or another type of driver could be used, if driving the oscillators or switches of the inverters are desired. An artisan appreciates these differences as lying within the spirit of the invention and the scope of the appended claims.

What is claimed is:

1. A random number generator comprising:
    a pair of oscillators comprising a pair of inverters, each of the pair of oscillators having a feedback loop which when closed causes the respective oscillator to be an independent free-running oscillator;
    at least one delay device connected in the feedback loop between an output and input of at least one of the pair of oscillators;
    a pair of cross gate switches, each of which respectively connects an input of one oscillator to an output of another oscillator.

2. The random number generator according to claim 1, having a plurality of switches for controlling a timing connection of an input and an output of said pair of inverters.

3. The random number generator according to claim 2, wherein the plurality of switches equals four.

4. The random number generator according to claim 2, wherein the plurality of switches are controlled by a flip-flop.

5. The random number generator according to claim 1, wherein the plurality of switches are controlled by a flip-flop.

6. The random number generator according to claim 2, wherein at least one of the plurality of switches comprises at least one feedback loop switch connected between a respective output and respective input of at least one oscillator of the pair of oscillators.

7. The random number generator according to claim 6, wherein the set of switches are controlled by a flip-flop.

8. The random number generator according to claim 6, wherein the plurality of switches are controlled by a flip-flop.

9. The random number generator according to claim 6, wherein the feedback loop switches comprise parallel complementary MOSFETs.

10. The random number generator according to claim 6, wherein the feedback loop switches are comprised of multiplexors.

11. The random number generator according to claim 6, wherein at least some of the switches are comprised of multiplexors.

12. The random number generator according to claim 6, wherein when said switches comprise a pair of feedback loop switches connected so that the pair of oscillators form a bi-stable device with positive feedback resolving to a logic state when the cross gate switches are closed and the feedback loop switches are opened.

13. The random number generator according to claim 12, wherein subsequent to the closing of said feedback loop switches and opening the cross gate switches, a latching device is connected to at least one of the oscillator outputs to permit a reading of a random generated bit when said cross gate switches are reopened.

14. The random number generator according to claim 13, wherein at least some of the switches are comprised of multiplexors.

15. The apparatus according to claim 12, wherein subsequent to the closing of said feedback loop switches and opening the cross gate switches, a relative and absolute value of the instantaneous output voltage and the internal noise determine the logic state the random number generator will settle in after the feedback loop switches are opened to stop the oscillator.

16. The apparatus according to claim 15, wherein the random number generator reaches a metastable state upon closing the feedback loop switches to start the oscillator.

17. The apparatus according to claim 15, wherein the random number generator reaches a metastable state by opening the feedback loop switches and permitting oscillator voltages to resolve to their final value.

18. The apparatus according to claim 1, wherein the delay device comprises two delay devices having mutually different numbers of buffer gates.

19. The apparatus according to claim 1, wherein the delay device comprises two delay devices having mutually different numbers of inverters.

20. A method for providing a metastable random number generator, comprising:
  (a) connecting a pair of oscillators, so that each output is fed back to the respective input of the oscillators via a delay device to form a pair of independent free-running oscillators, wherein each of the oscillators comprises an inverter; and
  (b) connecting an input signal of one oscillator to an output of another oscillator of said pair of oscillators and disconnecting the feedback to the respective outputs of the oscillators;
  wherein (b) further comprises connecting a pair of cross gate switches, each of which respectively connects an input of one inverter to an output of another inverter of said pair of oscillators.

21. The method according to claim 20, wherein the delay devices are provided with mutually different numbers of buffer gates.

22. The method according to claim 20, wherein the delay devices comprise mutually different numbers of inverters.

23. The method according to claim 20 further comprising (d) providing each of the pair of inverters with a feedback loop switch.

24. The method according to claim 23 wherein the pair of inverters form a bi-stable device with positive feedback resolving to a logic state by opening said feedback loop switches and closing the cross gate switches are closed.

25. The method according to claim 24 wherein subsequent to the closing of said feedback loop switches and opening the cross gate switches, (e) connecting a latching mechanism to at least one of the oscillator outputs so as to permit a reading of a random generated bit when said cross gate switches are reopened.

26. The method according to claim 25 wherein subsequent to the opening of said feedback loop switches and closing the cross gate switches, to stop the oscillators, a relative and absolute value of the instantaneous output voltage of the oscillator and the internal noise determine the logic state in which the random number generator will settle in.

27. The method according to claim 25, wherein subsequent to the random number generator reaching a metastable state, opening the cross gate switches and closing the feedback loop switches to start the oscillators.

28. The method according to claim 25, wherein the random number generator reaches a metastable state by closing the cross gate switches and opening the feedback loop switches and permitting oscillator voltages to be latched and the latch to resolve to a final logic value.

29. The method according to claim 25, wherein the random number generator reaches a metastable state by opening the feedback loop switches while closing the cross-gate switches and permitting a latch formed by the pair of inverters to settle to a logic state in a metastable way by oscillation periods getting gradually longer until voltages resolve to a final value.

30. The method of according to claim 29 wherein at least some of the switches are comprised of multiplexors.

* * * * *